(12) United States Patent
Tseng et al.

(10) Patent No.: US 11,303,554 B2
(45) Date of Patent: Apr. 12, 2022

(54) CONCURRENT INTERFACES BETWEEN A PROBE AND APPLICATIONS THAT MONITOR VIRTUAL NETWORK FUNCTIONS

(71) Applicant: Nokia Solutions and Networks Oy, Espoo (FI)

(72) Inventors: Yu-Chia Tseng, Massy (FR); Gopalasingham Aravinthan, Savigny-sur-Orge (FR); Bogdan Uscumlic, Les Ulis (FR); Liat Pele, Hod HaSharon (IL); Guillermo Rodriguez-Navas, Jerusalem (IL)

(73) Assignee: Nokia Solutions and Networks Oy, Espoo (FI)

( * ) Notice: Subject to any disclaimer, the term of this patent is extended or adjusted under 35 U.S.C. 154(b) by 85 days.

(21) Appl. No.: 16/941,265

(22) Filed: Jul. 28, 2020

(65) Prior Publication Data
US 2022/0038361 A1 Feb. 3, 2022

(51) Int. Cl.
| | |
|---|---|
| *H04L 12/26* | (2006.01) |
| *H04L 43/12* | (2022.01) |
| *G06F 9/455* | (2018.01) |
| *H04W 24/08* | (2009.01) |

(52) U.S. Cl.
CPC .............. *H04L 43/12* (2013.01); *G06F 9/455* (2013.01); *H04W 24/08* (2013.01)

(58) Field of Classification Search
CPC .............................. H04L 43/00; H04W 24/08
See application file for complete search history.

(56) References Cited

U.S. PATENT DOCUMENTS

| | | | | |
|---|---|---|---|---|
| 11,196,640 | B2* | 12/2021 | Dravid | ................ H04L 41/0806 |
| 2017/0005935 | A1* | 1/2017 | Tao | ...................... H04L 67/1002 |
| 2017/0063927 | A1* | 3/2017 | Schultz | ................... H04L 63/20 |

(Continued)

FOREIGN PATENT DOCUMENTS

| | | | | |
|---|---|---|---|---|
| EP | 3522450 A1 * | 8/2019 | ............... | G06F 8/61 |
| EP | 3103217 B1 * | 10/2019 | ......... | H04L 43/0817 |

OTHER PUBLICATIONS

"5G for the connected World", https://www.3gpp.org/news-events/2088-5g-for-the-connected-world, published Nov. 13, 2019, accessed May 27, 2020, 3 pages.

(Continued)

*Primary Examiner* — Jamaal Henson
(74) *Attorney, Agent, or Firm* — Tong, Rea, Bentley & Kim, LLC

(57) ABSTRACT

A processor instantiates a virtual network function (VNF) and a probe to monitor at least one metric associated with the VNF. The processor also allocates a pool of ports to the probe. A transceiver establishes one or more first interfaces between the probe and one or more applications using one or more first ports from the pool of ports. Information such as metrics generated by the ports is concurrently exchange between the probe and the applications using the first interfaces. In some cases, a second interface is established between the probe and a monitoring server. The probe reports mission critical events to the applications via the first interfaces and non-mission critical events to the monitoring server via the second interface concurrently with reporting the mission critical events.

24 Claims, 5 Drawing Sheets

(56) References Cited

U.S. PATENT DOCUMENTS

| | | | | |
|---|---|---|---|---|
| 2018/0020015 | A1* | 1/2018 | Munro | G06F 21/552 |
| 2018/0173549 | A1* | 6/2018 | Browne | H04L 43/0817 |
| 2019/0052549 | A1* | 2/2019 | Duggal | G06Q 30/04 |
| 2019/0052579 | A1* | 2/2019 | Senarath | H04L 41/5048 |
| 2020/0076726 | A1* | 3/2020 | Seth | H04L 45/28 |
| 2020/0195553 | A1* | 6/2020 | Yigit | H04L 43/0805 |
| 2021/0385120 | A1* | 12/2021 | Curtis | H04L 41/04 |

OTHER PUBLICATIONS

"Apache NiFi", The Apache Software Foundation, 2 pages.
"Apache Nifi MiNiFi", The Apache Software Foundation, 2 pages.
Cherrared et al., "LUMEN: A Global Fault Management Framework for Network Virtualization Environments", Innovation in Clouds, Internet and Networks and Workshops, Feb. 2018, 14 pages.
"Ericsson Orchestrator", Accessed Jul. 28, 2020, 2 pages.
"Ganglia Monitoring System", ganglia.sourceforge.net, accessed May 27, 2020, 4 pages.
"Graphite does three things: Kick ass, Chew bubblegum. Make it easy to store and graph metrics. (And it's all out bubblegum.)", http://graphiteapp.org, accessed May 27, 2020, 8 pages.
Hinman, "Improving Response Latency in Elasticsearch with Adaptive Replica Selection", https://www.elastic.co/blog/improving-response-latency-in-elasticsearch-with-adaptive-replica-selection, published May 3, 2018, accessed May 27, 2020, 5 pages.
"Mano and Monitoring, Two Bumps on the Road to SDN/NFV", Altran, 12 pages.
"Istio: Connect, Secure, Control, and Observe Services.", https://istio.io, accessed May 27, 2020, 3 pages.
"ONAP: Open Network Automation Platform", https://www.onap.org, accessed May 27, 2020, 4 pages.
"From metrics to insight, Power your metrics and alerting with a leading open-source monitoring solution.", Prometheus—Monitoring system & time series database, May 27, 2020, 6 pages.
"OSM—Open Source MANO is an ETSI-hosted project to develop an Open Source NFV Management and Orchestration (MANO) software stack aligned with ETSI NFV.", https://osm.etsi.org, accessed May 27, 2020, 7 pages.
"CloudBand", Release 17.5, Nokia Corporation, Jul. 2017, 5 pages.
"TOSCA-based MANO Orchestration for NFV based on Cloudify Orchestration & VMware Infrastructure", Product Datasheet, 2 pages.
"Production-Grade Container Orchestration, Automated container deployment, scaling, and management", Kuberetes.io, Accessed May 27, 2020, 10 pages.
"Riemann—A network monitoring system", riemann.io, Accessed May 27, 2020, 3 pages.
Sciancalepore et al., "z-TORCH: An Automated NFV Orchestration and Monitoring Solution", arXiv: 1807.02307v1, Jul. 6, 2018, 14 pages.
"Monitoring at the speed of automation", Sensu.io, Accessed May 27, 2020, 5 pages.
"Zabbix: The Enterprise-Class Open Source Network Monitoring Solution", zabbix.com, Accessed May 27, 2020, 11 pages.

* cited by examiner

US 11,303,554 B2

CONCURRENT INTERFACES BETWEEN A PROBE AND APPLICATIONS THAT MONITOR VIRTUAL NETWORK FUNCTIONS

BACKGROUND

Fifth Generation (5G) networks are implemented using network function virtualization (NFV) architectures that implement virtualized network functions (VNFs), which are connected, or chained together, to create communication services provided by the 5G network. Instead of allocating custom hardware appliances for each network function, a VNF includes one or more virtual machines running on an NFV infrastructure (NFVI) that includes the hardware, firmware, and software such as memory, processors, and networking components that are used to construct the environment for deploying the VNFs. An NFV management and orchestration (MANO) architectural framework manages and orchestrates the NFVI and VNFs using a collection of functional blocks, data repositories used by the functional blocks, and reference points and interfaces through which the functional blocks exchange information. The NFV MANO framework supports monitoring of entities within the NFV architecture using probes that collect or extract information that is used to generate one or more metrics that represent the performance of the monitored entities, e.g., one or more of the VNFs. The probes provide the collected information or metrics to applications via a hierarchy of monitoring servers. As used herein, the term "probe" refers to program code or software that is instantiated using the NFV architecture in association with (or as an integral part of) corresponding monitoring entities. For example, program code representing a probe can be used to instantiate the probe as a part of a VNF supported by the NFV architecture.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
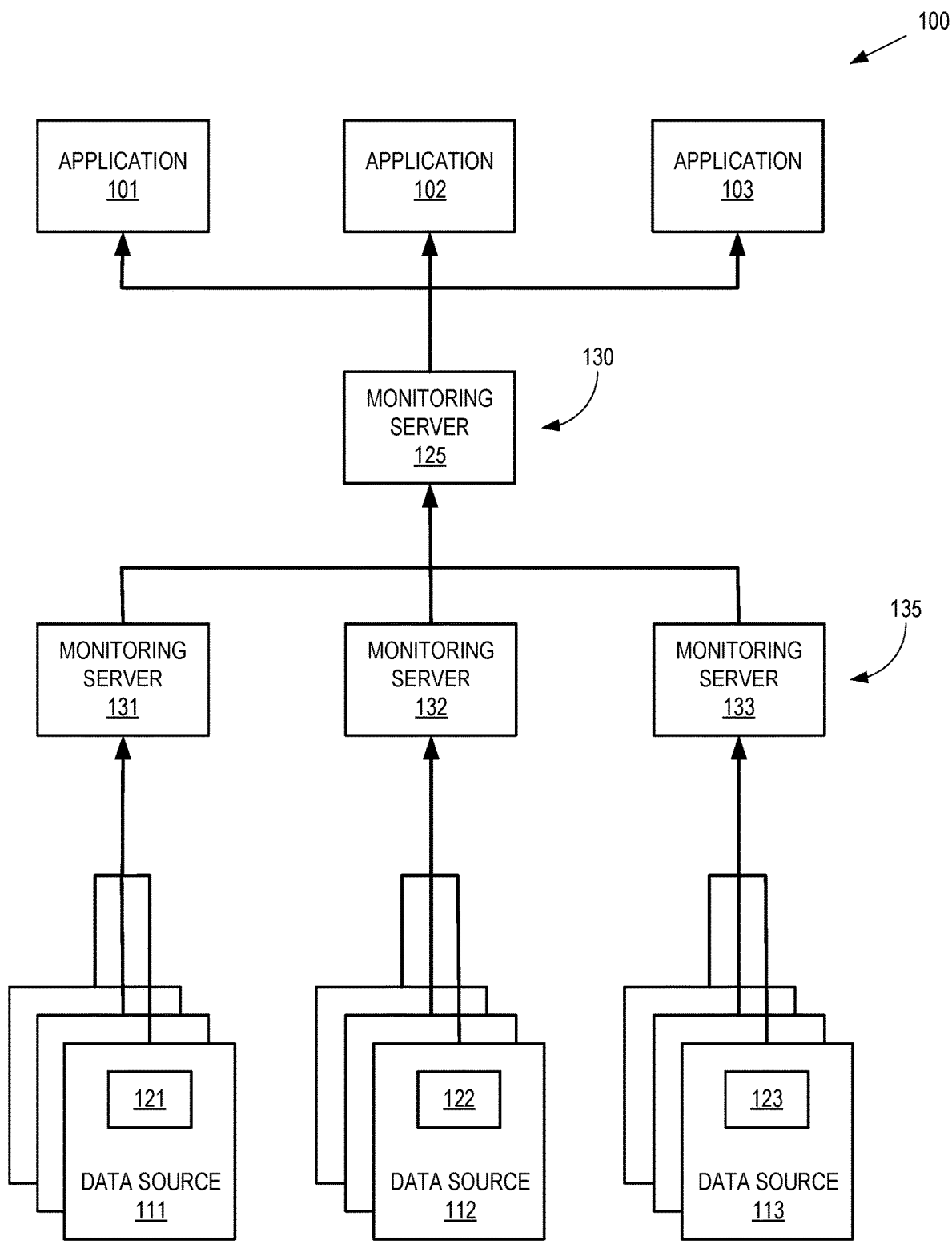
FIG. 1 is a block diagram of a conventional hierarchy of monitoring servers to monitor probes in a network function virtualization (NFV) monitoring framework.

Mission critical services provided by a network are subject to stringent delay and performance requirements. For example, 5G networks support Ultra-Reliable Low Latency Communication (URLLC) that targets end-to-end latencies of 1 millisecond (ms) (e.g., to support factory automation applications) and reliabilities of at least 99.999% (e.g., for automotive traffic control applications such as platooning). Most of the signal processing in a 5G communication system is done in the network by cloud servers rather than close to the radio antennas that support wireless communication, e.g., with IoT devices. The latency requirements for the cloud server architecture are even more stringent: round trip time budgets are expected to be in the range of 200 to 500 microseconds (µs). Services provided by a 5G network are required to meet the target end-to-end latencies, which places correspondingly severe constraints on the latency for monitoring VNFs in the 5G network, particularly for mission-critical services provided by the 5G network. However, the applications in a conventional hierarchical monitoring framework only receive monitoring data via the monitoring servers and not directly from the probes. Networking delays at the multiple levels of the hierarchical monitoring framework introduce unpredictable or severe latencies, which increases with an increasing number of levels in the hierarchy.

FIGS. 1-5 disclose embodiments of systems and techniques that reduce the latency of service monitoring in a network implemented using an NFV architecture (relative to the latency introduced by a hierarchical monitoring framework) by allocating a pool of ports to a probe in response to instantiating the probe in a virtual network function (VNF). The ports in the pool are independently and separately allocated to interfaces between the probe and monitoring applications implemented in the VNF or monitoring servers. The probe is implemented in the data plane of the VNF and monitors one or more metrics associated with the VNF. The probe provides information representing the metrics to one or more monitoring applications (implemented in the application plane) via corresponding interfaces over ports that are allocated from the pool of ports associated with the probe. The monitoring applications process monitoring data such as metrics received from the probe and provide the data to corresponding clients. Some services with special requirement can be deployed as monitoring applications. For example, in terms of fault management, a monitoring application can be a persistent storage tool that functions as a cache to support redeployment of the service due to failure.

A monitoring server is implemented in the control plane and deploys the probe and the monitoring applications in the VNF, as well as collecting metrics generated by the probe. Some embodiments of the monitoring server communicate with the probe via an interface (and port from the pool) that can be used concurrently with the interfaces between the probe and the monitoring applications. In some embodiments, the probe is configured to monitor one or more mission-critical events that are to be reported to the monitoring applications with a latency that is less than a maximum latency. The mission-critical events are reported directly to the monitoring applications via interfaces supported by ports in the pool. Non-mission-critical events are reported to the monitoring server via another interface supported by one of the ports in the pool. Thus, mission-critical events are reported at real-time latencies (e.g., less than 1 ms) in a 5G network without requiring that every application be connected directly to the probe via a separate port.

FIG. 1 is a block diagram of a conventional hierarchy 100 of monitoring servers to monitor probes in a network function virtualization (NFV) monitoring framework. The conventional hierarchy 100 includes one or more applications 101, 102, 103 (collectively referred to herein as "the applications 101-103") that utilize resources of an NFV architecture (not shown in FIG. 1 in the interest of clarity). The NFV architecture includes data sources 111, 112, 113 (collectively referred to herein as "the data sources 111-113") such as virtual network functions (VNFs) or portions of an NFV infrastructure (NFVI) that are implemented in the NFV architecture. One or more probes 121, 122, 123 (collectively referred to herein as "the probes 121-123") are instantiated in the data sources 111-113 to collect or extract information that is representative of a state or performance of the corresponding data sources 111-113. The probes 121-123 use the extracted information to generate one or more metrics that represent the performance of the data sources 111-113.

The probes 121-123 provide the collected information or metrics to applications via a hierarchy of monitoring servers including a monitoring server 125 in a first layer 130 and monitoring servers 131, 132, 133 (collectively referred to herein as "the monitoring servers 131-133") in a second layer 135. Although two layers 130, 135 are shown in the hierarchy 100 in FIG. 1, some embodiments of the hierarchy 100 include more or fewer layers that include more or fewer monitoring servers. In the illustrated embodiment, the monitoring servers 131-133 receive metrics from the corresponding probes 121-123. The monitoring servers 131-133 collect, process, and aggregate portions of the metrics and provide the process information to the monitoring server 125, which collects, processes, and aggregates the receive metrics. The monitoring server 125 provides portions of the collected, processed, or aggregated metrics to one or more of the applications 101-103.

The hierarchy 100 supports scalability for connecting large numbers of distributed data sources 111-113 and corresponding probes 121-123. However, there are drawbacks to implementing the monitoring servers 125, 131-133 in the hierarchy 100. In some embodiments, the applications 101-103 only receive the monitoring data (such as the metrics) from the monitoring server 125, while the applications 101-103 do not receive data directly from the probes 121-123. The hierarchy 100 including multiple levels 130, 135 also introduces severe or unpredictable latencies due to networking or processing delays between the probes 121-123 and the applications 101-103. Increasing the number of levels of monitoring servers in the hierarchy 100, e.g., to support large numbers of distributed data sources 111-113 and the corresponding probes 121-123, exacerbates the latency problems. Thus, a hierarchical implementation of the monitoring servers 125, 131-133 is not well-suited to monitor latency sensitive events such as events that occur in 5G communication systems. For example, the Third Generation Partnership Project (3GPP) latency requirements state that low latency translates usually to a few milliseconds, even 1 ms in the extreme case, for end-to-end latency between client and server on the user plane. Control plane latency requirements are usually less stringent, e.g., in the range of 10 ms or more.

Figure 2:
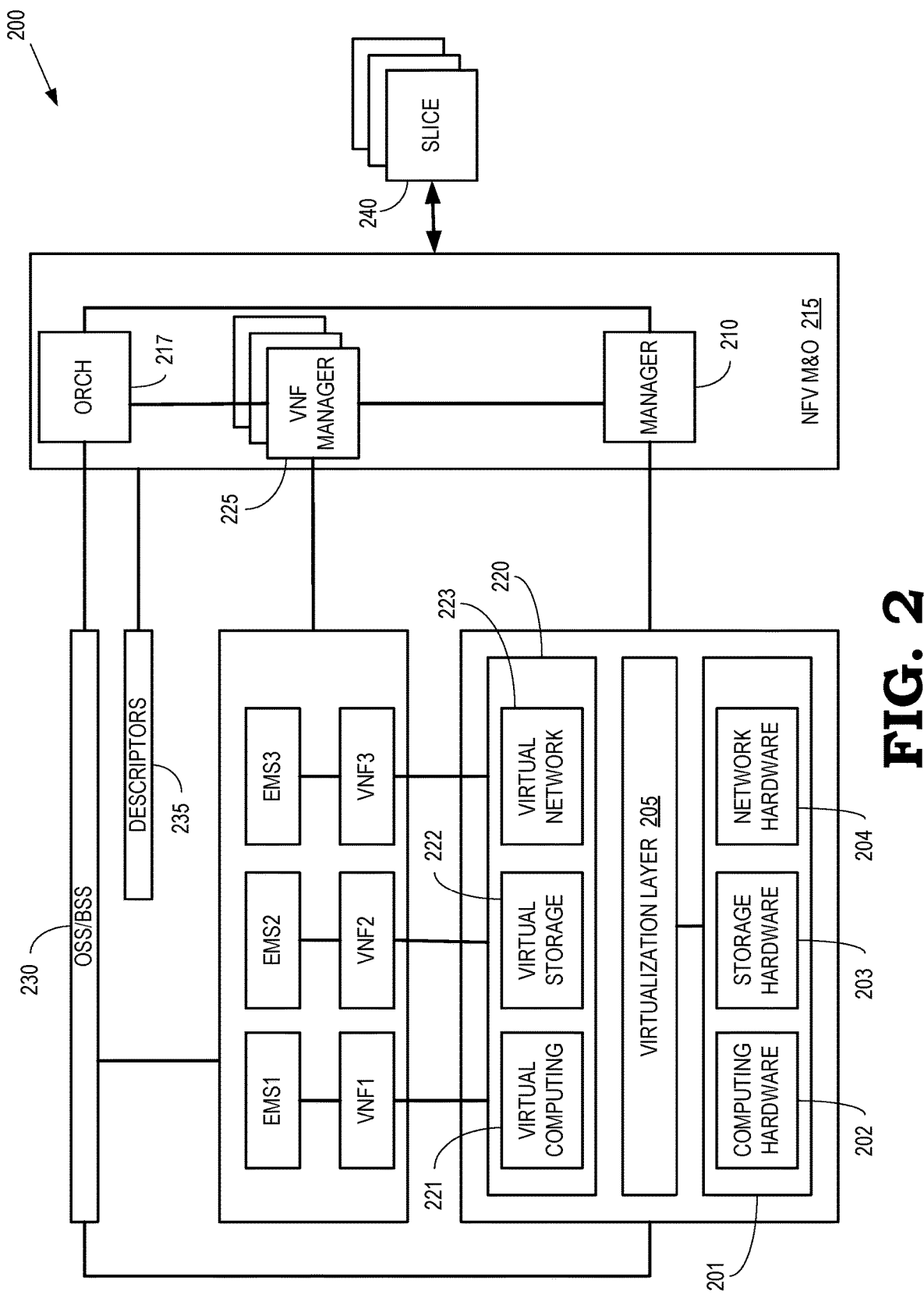
FIG. 2 is a block diagram of an NFV architecture according to some embodiments.

FIG. 2 is a block diagram of a NFV architecture 200 according to some embodiments. The NFV architecture 200 is used to support concurrent interfaces between one or more probes and one or more applications, as discussed herein. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of an NFV management and orchestration (MANO) module 215. Some embodiments of the virtualized infrastructure manager 210 are configured to collect and forward performance measurements and events that may occur in the NFV architecture 200. For example, performance measurements may be forwarded to an orchestrator (ORCH) 217 implemented in the NFV MANO 215. The hardware resources 201 and the virtualization layer 205 may be used to implement virtual resources 220 including virtual computing 221, virtual storage 222, and virtual networking 223. As discussed herein, some embodiments of the NFV MANO module 215 implement one or more monitoring servers to receive information such as metrics generated by probes, process the received information, and provide the processed information to one or more applications.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) are implemented using virtual machines supported by the virtual computing resources 221, virtual memory supported by the virtual storage resources 222, or virtual networks supported by the virtual network resources 223. As discussed herein, probes associated with the virtual networking functions (VNF1, VNF2, VNF3) are instantiated over the NFV infrastructure (e.g., the hardware resources 201) and utilize the virtual resources 220. In some embodiments, the probes are instantiated as part of the corresponding virtual networking functions (VNF1, VNF2, VNF3).

Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the virtualized infrastructure manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices 240 that provide user plane or control plane functions such as service functions that are implemented in 5G networks, e.g., in a 5G service chain. A network slice 240 is a complete logical network that provides communication services and network capabilities, which can vary from slice to slice. User equipment can concurrently access multiple network slices 240. Some embodiments of user equipment provide Network Slice Selection Assistance Information (NSSAI) parameters to the network to assist in selection of a slice instance for the user equipment. A single NSSAI may lead to the selection of several network slices 240. The NFV architecture 200 can also use device capabilities, subscription information and local operator policies to do the selection. An NSSAI is a collection of smaller components, Single-NSSAIs (S-NSSAI), which each include a Slice Service Type (SST) and, in some embodiments, a Slice Differentiator (SD). Slice service type refers to an expected network behavior in terms of features and services (e.g., specialized for broadband or massive IoT), while the slice differentiator can select among several network slice instances of the same type, e.g. to isolate traffic related to different services into different network slices 240.

Figure 3:
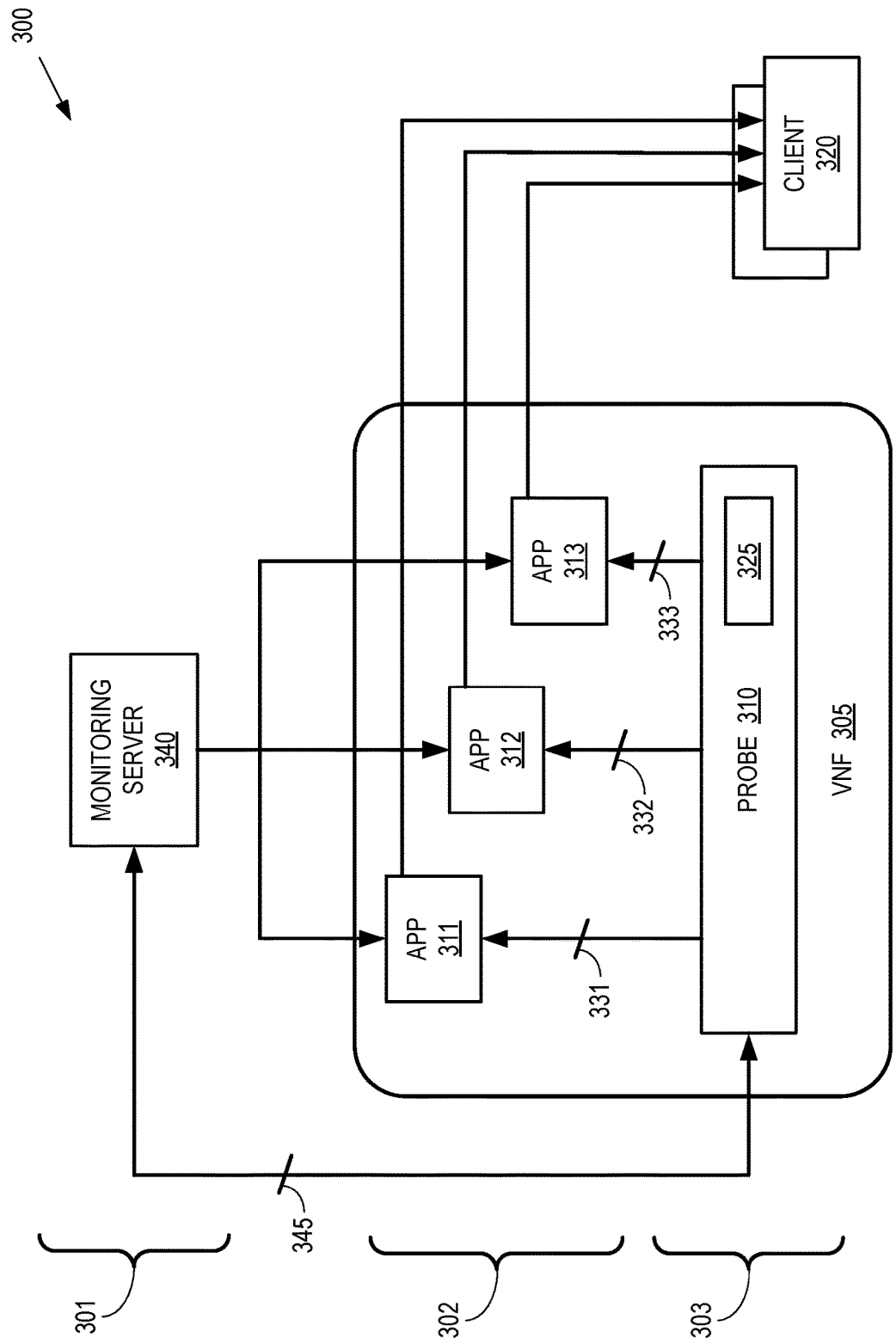
FIG. 3 is a block diagram of a monitoring architecture that supports direct communication between probes and applications in an NFV architecture according to some embodiments.

FIG. 3 is a block diagram of a monitoring architecture 300 that supports direct communication between probes and applications in an NFV architecture according to some embodiments. The monitoring architecture 300 is implemented in some embodiments of the NFV architecture 200 shown in FIG. 2. The monitoring architecture 300 includes entities in a control plane 301, an application plane 302, and a data plane 303. The monitoring architecture 300 is configured to monitor a virtual network function (VNF) 305 using a corresponding probe 310 instantiated in the data plane 303 of the VNF 305 and applications 311, 312, 313 (collectively referred to herein as "the application 311-313") instantiated in the application plane 302 of the VNF 305. Although three application 311-313 are shown in FIG. 3, some embodiments of the VNF 305 instantiate more or fewer applications. The applications 311-313 provide services to one or more clients 320.

The probe 310 includes (or is access to) a pool 325 of ports that are allocated to support interfaces to the probe 310. In the illustrated embodiment, the probes 310 uses three ports from the pool 325 to establish three corresponding interfaces 331, 332, 333 (collectively referred to herein as "the interfaces 331-333") between the probe 310 and the applications 311-313, respectively. Information collected by the probe 310 such as performance metrics for the VNF 305 are transmitted to one or more of the applications 311-313. Different subsets of the information can be provided to different subsets of the applications 311-313 and the information can be transmitted from the probe 310 to the applications 311-313 independently, separately, or concurrently. The information is transmitted via the interfaces 331-333 periodically, at predetermined time intervals, at scheduled times, in response to requests from the application 311-313, or at other times. The applications 311-313 process the information received from the probe 310 via the interfaces 331-333 and use the processed information to modify their operation or provide signaling to the client 320.

A monitoring server 340 communicates with the probe 310 via an interface 345. The probe 310 can therefore provide information such as performance metrics associated with the VNF 305 to the monitoring server 340 via the interface 345. Although a single monitoring server 340 shown in FIG. 3, the monitoring server 340 can also represent a hierarchy of monitoring servers, as discussed herein. The monitoring server 340 also communicates with the application 311-313. In some embodiments, the monitoring server 340 instantiates the application 311-313 in the VNF 305.

The monitoring architecture 300 therefore allows monitoring information to be communicated directly from the probe 310 to the applications 311-313 via the interfaces 331-333, as well as allowing the monitoring information to be communicated to the monitoring server 340 via a separate interface 345. The interfaces 331-333 support low-latency monitoring (e.g., less than 1 ms) that minimizes the latency between the probe 310 and the applications 311-313 because these latencies only depend on the host processing speed and do not depend on the network data transfer data rate. In contrast, communication between the probe 310 and the monitoring server 340 via the interface 345 has a relatively high latency because the latency depends on both the host processing speed and the network data transfer data rate over the interface 345.

In some embodiments, interfaces 331-333, 345 are used selectively depending upon whether the event that is monitored and reported by the probe 310 is a mission-critical event that requires low latency or a non-mission critical event that does not require a low latency. For example, if mission-critical events are (at least in part) defined as events that are reported with less than a maximum latency, the probe 310 is configured to monitor the mission-critical events and report the mission-critical events via the interfaces 331-333 with a latency that is less than the maximum latency. The probe 310 reports information associated with non-mission-critical events to the monitoring server 340 via the interface 345 with latencies that are larger than the maximum latency. Thus, mission-critical events can be reported at real-time latencies (e.g., less than 1 ms) in a 5G network, while conserving the bandwidth of the interfaces 331-333 by reporting non-mission-critical events via the interface 345.

Figure 4:
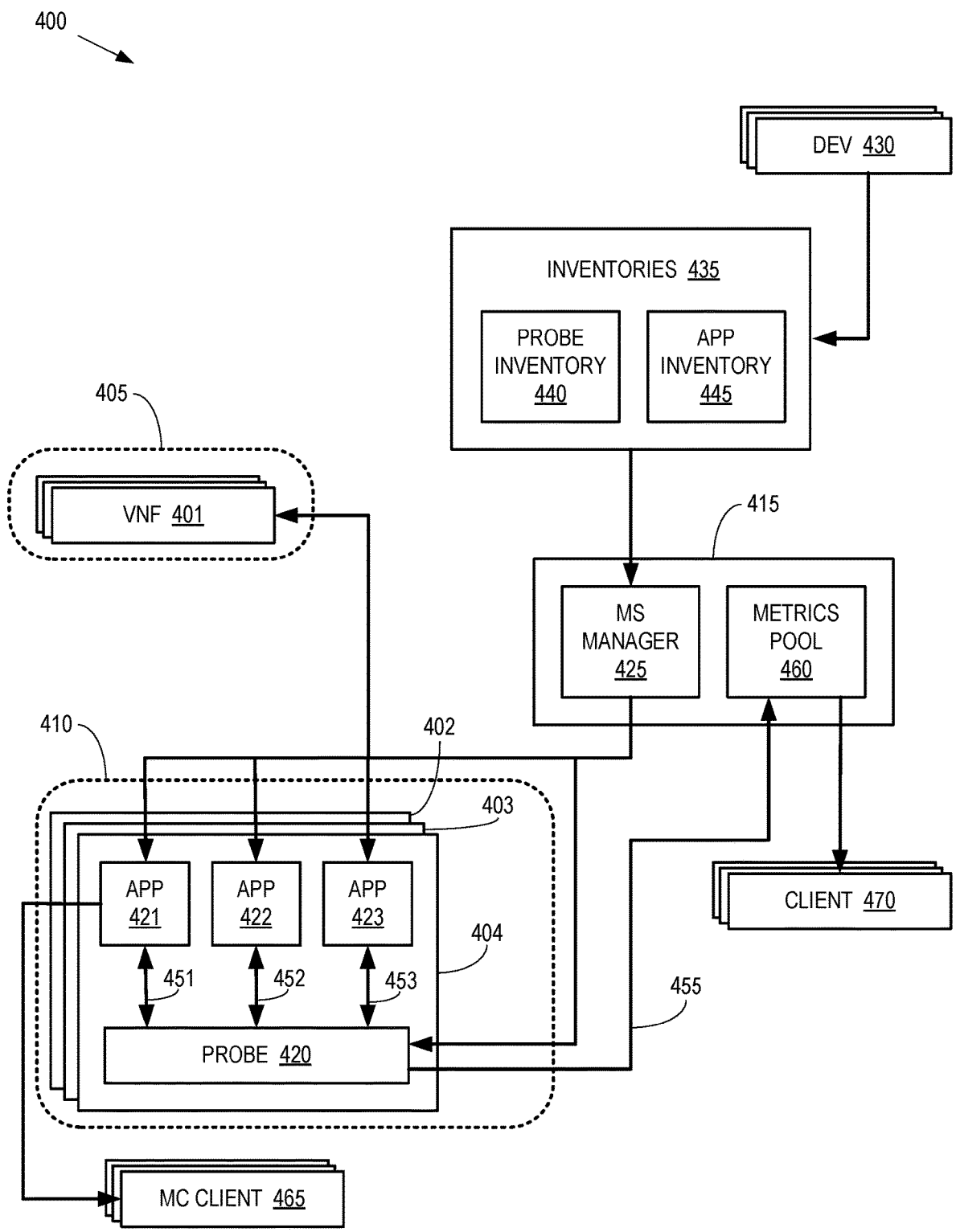
FIG. 4 is a block diagram of a monitoring architecture including interfaces between probes and applications in an NFV architecture according to some embodiments.

FIG. 4 is a block diagram of a monitoring architecture 400 including interfaces between probes and applications in an NFV architecture according to some embodiments. The monitoring architecture 400 is implemented in some embodiments of the NFV architecture 200 shown in FIG. 2 and the monitoring architecture 300 shown in FIG. 3. The monitoring architecture 400 is used to monitor VNF 401, 402, 403, 404 (collectively referred to herein as the VNF 401-404) that are associated with different deployment and configuration jobs 405, 410.

The monitoring architecture 400 also includes a monitoring server 415, which represents a single monitoring server or a hierarchy of monitoring servers. The monitoring server 415 deploys probes and applications in the VNF 401-404. For example, the monitoring server 415 uses the job 410 to deploy a probe 420 and applications 421, 422, 423 (collectively referred to herein as "the applications 421-423") in the VNF 404. Deploying the probe 420 includes allocating a pool of ports to the probe 420, such as the pool 325 of ports that are allocated to the probe 310 shown in FIG. 3. Some embodiments of the monitoring server 415 include a monitoring server (MS) manager 425 that instantiates the probe 420 and the applications 421-423 based on code that is written by one or more developers 430 and committed to inventories 435, e.g., as part of the job 410. The MS manager 425 instantiates the probe 420 using code committed to a probe inventory 440 and the MS manager 425 instantiates the applications 421-423 using code committed to an application inventory 445. The VNF 404 instantiates interfaces 451, 452, 453 (collectively referred to herein as "the interfaces 451-453") between the probe 420 and the applications 421-423, respectively. The VNF 404 also instantiates an interface 455 between the probe 420 and a monitoring metrics pool 460 in the monitoring server 415.

Clients associated with the monitoring architecture 400 are partitioned into mission-critical clients 465 and non-mission critical clients 470. In some embodiments, the partition is made based (at least in part) on the latency requirements of the clients 465, 470. The mission-critical clients 465 require latencies less than a maximum latency and the non-mission critical clients 470 require latencies that are greater than the maximum latency or are not subject to any latency constraints. The mission-critical clients 465 receive monitored information (such as metrics produced by the probe 420 or information derived from these metrics) directly from the applications 421-423, which receive information from the probe 420 via the interfaces 451-453. Information is therefore conveyed from the probe 420 to the mission-critical clients 465 with a latency that is less than the maximum latency. The non-mission critical clients 470 receive monitored information from the metrics pool 460 in the monitoring server 415, which receives this information via the interface 455. The non-mission critical clients 470 therefore receive the monitored information at a higher latency, e.g., due to network or processing delays associated with the monitoring server 415.

Figure 5:
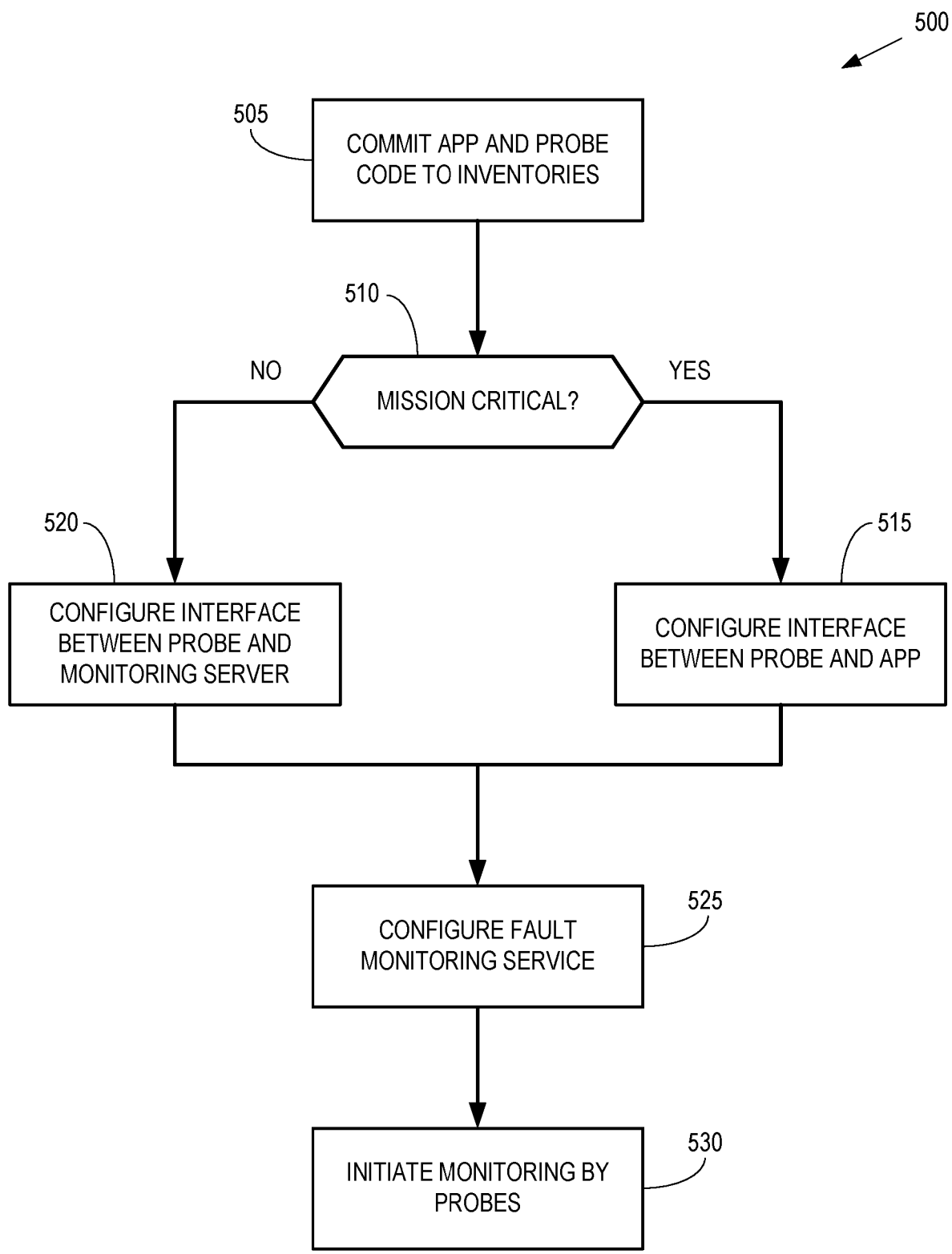
FIG. 5 is a flow diagram of a method of providing monitoring information for mission-critical applications via interfaces between a probe and a set of applications according to some embodiments.

FIG. 5 is a flow diagram of a method 500 of providing monitoring information for mission-critical applications via interfaces between a probe and a set of applications according to some embodiments. The method 500 is implemented in some embodiments of the monitoring architecture 300 shown in FIG. 3 and the monitoring architecture 400 shown in FIG. 4.

At block 505, developers commit code representing the probe and the associated applications to corresponding inventories. The code is used to instantiate the probe and the associated applications in a VNF that provide services to a client.

At decision block 510, the system determines whether the client is a mission-critical client. As discussed herein, the determination is based (at least in part) on a latency requirement for reporting monitoring information to the client. Clients are categorized as mission-critical in response to having a latency requirement that is less than a maximum latency. If the client is mission-critical, the method 500 flows to the block 515. If the client is non-mission critical, the method 500 flows to the block 520.

At block 515, a monitoring server configures a first interface between the probe and the application that is providing monitoring information to the client. At block 520, the monitoring server configures a second interface between the program the monitoring server. The method 500 flows from the blocks 515, 520 to the block 525.

At block 525, the monitoring server configures a fault monitoring service that uses the probe to monitor performance of the VNF that includes the probe and the application. Some embodiments of the fault monitoring service scan the probe (and other probes that are implemented on the VNF) and the application (and other applications that are implemented on the VNF) to check heartbeats, e.g., by identifying the HTTP response status codes. If a failure is detected, the monitoring server is informed to re-deploy the service. At block 530, monitoring of the VNF by the probes is initiated. Information generated by the monitor is subsequently provided from the probes to the applications via the first interface (for mission-critical clients) or the second interface (for non-mission-critical clients).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
    i. a combination of analog and/or digital hardware circuit(s) with software/firmware and
    ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    instantiating a probe in a virtual network function (VNF) on at least one processor to monitor at least one metric associated with the VNF;
    allocating a pool of ports to the probe; and
    establishing at least one first interface between the probe and at least one application using at least one first port from the pool of ports.

2. The method of claim 1, wherein instantiating the probe comprises instantiating the probe in a data plane of the VNF, and wherein the at least one application is instantiated in an application plane of the VNF.

3. The method of claim 1, wherein establishing the at least one first interface comprises establishing a plurality of first interfaces between the probe and a plurality of applications using a plurality of first ports from the pool of ports.

4. The method of claim 3, further comprising:
    concurrently exchanging information between the probe and the plurality of applications using the plurality of first interfaces.

5. The method of claim 1, wherein instantiating the probe in the VNF comprises: instantiating the probe based on information provided by a monitoring server implemented in a control plane, and further comprising:
    instantiating the at least one application in the VNF based on information provided by the monitoring server.

6. The method of claim 5, further comprising:
    allocating a second port from the pool of ports to the monitoring server; and
    establishing a second interface between the probe and the monitoring server using the second port.

7. The method of claim 6, further comprising:
    exchanging information between the probe and the monitoring server via the second interface concurrently with exchanging information between the probe and the at least one application via the at least one first interface.

8. The method of claim 7, further comprising:
    identifying at least one mission critical event associated with the VNF; and
    reporting the at least one mission critical event to the at least one application via the at least one first interface.

9. The method of claim 8, wherein reporting the at least one mission critical event to the at least one application comprises reporting the at least one mission critical event to the at least one application with a latency that is less than a maximum latency associated with the at least one mission critical event.

10. The method of claim 8, further comprising:
    identifying at least one non-mission critical event associated with the VNF; and
    reporting the at least one non-mission critical event to the monitoring server via the second interface.

11. An apparatus, comprising:
    a processor configured to instantiate a virtual network function (VNF) and a probe to monitor at least one metric associated with the VNF, wherein the processor is configured to allocate a pool of ports to the probe; and
    a transceiver configured to establish at least one first interface between the probe and at least one application using at least one first port from the pool of ports.

12. The apparatus of claim 11, wherein the processor is configured to instantiate the probe in a data plane of the VNF, and wherein the processor is configured to instantiate the at least one application in an application plane of the VNF.

13. The apparatus of claim 11, wherein the transceiver is configured to establish a plurality of first interfaces between the probe and a plurality of applications using a plurality of first ports from the pool of ports.

14. The apparatus of claim 13, wherein the transceiver is configured to concurrently exchange information between the probe and the plurality of applications using the plurality of first interfaces.

15. The apparatus of claim 11, wherein the processor is configured to instantiate the probe based on information provided by a monitoring server implemented in a control plane, and wherein the processor is configured to instantiate the at least one application in the VNF based on information provided by the monitoring server.

16. The apparatus of claim 15, wherein the processor and the transceiver configured to:
    allocate a second port from the pool of ports to the monitoring server; and
    establish a second interface between the probe and the monitoring server using the second port.

17. The apparatus of claim 16, wherein the transceiver is configured to exchange information between the probe and the monitoring server via the second interface concurrently with exchanging information between the probe and the at least one application via the at least one first interface.

18. The apparatus of claim 17, wherein the processor is configured to:
    identify at least one mission critical event associated with the VNF; and
    report the at least one mission critical event to the at least one application via the at least one first interface.

19. The apparatus of claim 18, wherein the processor is configured to report the at least one mission critical event to the at least one application with a latency that is less than a maximum latency associated with the at least one mission critical event.

20. The apparatus of claim 18, wherein the processor is configured to:
    identify at least one non-mission critical event associated with the VNF; and
    report the at least one non-mission critical event to the monitoring server via the second interface.

21. An apparatus comprising:
    at least one processor; and
    at least one memory including computer program code;
    wherein the at least one memory and the computer program code are configured to, with the at least one processor, cause the apparatus at least to perform:
        instantiating a probe in a virtual network function (VNF) to monitor at least one metric associated with the VNF;

allocating a pool of ports to the probe; and
establishing at least one first interface between the probe and at least one application using at least one first port from the pool of ports.

22. The apparatus of claim 21, wherein the at least one memory and the computer program code are configured to, with the at least one processor, cause the apparatus at least to perform:
establishing a plurality of first interfaces between the probe and a plurality of applications using a plurality of first ports from the pool of ports; and
concurrently exchanging information between the probe and the plurality of applications using the plurality of first interfaces.

23. The apparatus of claim 21, wherein the at least one memory and the computer program code are configured to, with the at least one processor, cause the apparatus at least to perform:
allocating a second port from the pool of ports to a monitoring server;
establishing a second interface between the probe and the monitoring server using the second port; and
exchanging information between the probe and the monitoring server via the second interface concurrently with exchanging information between the probe and the at least one application via the at least one first interface.

24. The apparatus of claim 23, wherein the at least one memory and the computer program code are configured to, with the at least one processor, cause the apparatus at least to perform:
identifying at least one mission critical event associated with the VNF;
reporting the at least one mission critical event to the at least one application via the at least one first interface;
identifying at least one non-mission critical event associated with the VNF; and
reporting the at least one non-mission critical event to the monitoring server via the second interface concurrently with reporting the at least one mission critical event.

* * * * *